United States Patent [19]
Macrae

[11] Patent Number: 5,173,196
[45] Date of Patent: Dec. 22, 1992

[54] DEWATERING AND COMPACTING EQUIPMENT WITH HIGH PRESSURE PUMPING ARRANGEMENT

[76] Inventor: Dennis P. Macrae, 3 Trevithick Crescent, Redwood Park, Australia

[21] Appl. No.: 438,731

[22] Filed: Nov. 17, 1989

[51] Int. Cl.$^5$ .................... B01D 33/82; B30B 9/06
[52] U.S. Cl. .................... 210/808; 100/90; 100/116; 100/127; 100/129; 210/359; 210/406; 210/416.1; 210/770
[58] Field of Search .............. 100/90, 110, 116, 127, 100/129, 148, 185, 35; 210/136, 225, 350, 416.1, 770, 808, 497.01, 406, 359; 417/900; 34/14, 70, 92

[56] References Cited

U.S. PATENT DOCUMENTS

| | | | |
|---|---|---|---|
| 3,055,291 | 9/1962 | Ginaven | 100/129 |
| 3,225,453 | 12/1965 | Burner | 34/12 |
| 3,520,411 | 7/1970 | Busse et al. | 210/770 |
| 3,550,775 | 12/1970 | Cooley | 210/770 |
| 3,768,171 | 10/1973 | Bird et al. | 34/14 |
| 3,938,434 | 2/1976 | Cox | 100/90 |
| 4,136,035 | 1/1979 | Bogomolov et al. | 210/808 |
| 4,158,332 | 6/1979 | Melandri | 100/185 |
| 4,287,058 | 9/1981 | Larsen | 100/148 |
| 4,630,535 | 12/1986 | Haygreen | 100/127 |
| 4,826,607 | 5/1989 | Pearce | 210/770 |
| 4,872,404 | 10/1989 | Quetsch et al. | 100/110 |
| 4,897,194 | 1/1990 | Olson | 100/148 |

FOREIGN PATENT DOCUMENTS

| | | | |
|---|---|---|---|
| 7511003 | 9/1975 | Netherlands | 210/350 |
| 283362 | 7/1952 | Switzerland | 100/148 |

*Primary Examiner*—Robert A. Dawson
*Assistant Examiner*—Joseph Drodge
*Attorney, Agent, or Firm*—Oldham, Oldham & Wilson Co.

[57] ABSTRACT

A device for the removal of solids from slurries by continuous compaction in a screen chamber. Pressure of liquid in the chamber causes continuous extrusion of a dewatered solid from an open ended chamber. The walls of the chamber may be constructed from longitudinal wedge bars spaced apart to provide filtering spaces between them. A high pressure pumping arrangement, including a first slurry pump and an auxiliary piston pump, is provided to maintain a high-pressure throughout the chamber to facilitate the continuous extrusion.

11 Claims, 2 Drawing Sheets

DEWATERING AND COMPACTING EQUIPMENT WITH HIGH PRESSURE PUMPING ARRANGEMENT

INTRODUCTION

This invention relates to improvements in dewatering and compacting equipment and more particularly to equipment for the dewatering of particulate or fibrous slurries to produce a dewatered product and a relatively clean filtrate.

BACKGROUND

Various forms of filtration and compaction equipment have been devised but in general these have included either many moving parts or a fixed system both of which have worked in a batch compaction mode. That is, a batch of slurry to be dewatered is fed into a chamber and then a piston may compact the slurry with water escaping through a screen to produce a wad or block of dewatered waste which is then removed. The limitation on this process is that it is non-continuous and hence not applicable for industrial application. There is a high wear because of the piston travel past an inlet port and also wear within the chamber and hence particularly abrasive slurries can wear such a chamber out in very short time. There may also be a slow compaction rate which will again reduce the usefulness of such a process.

It is the object of this present invention to provide a more continuous process for the dewatering of slurries and the like either for producing a desirable product from the solids in the slurry or to clean a filtrate.

To look at one example it is possible to produce slurries of waste paper fibres and to dewater these for subsequent formation into desirable products such as wood substitutes for many applications. In this case it is the solids product which is the desirable product.

To look at another example, in the asbestos removal industry for instance, considerable amounts of liquids contaminated with asbestos fibres are produced and these wastes are difficult to dispose of unless the fibrous material can be extracted from the liquid. The fibres may be a very low concentration in the liquid but all of the liquid must be filtered. Similarly in the paper making industry, paper fibres remain in the waste waters and these should be removed before the waste waters are disposed of. There are examples where the desirable product is a clean filtrate.

The invention, however, is not restricted to the removal of fibrous materials from slurries but may also be used for the removal of particulate materials such as clays, diatomaceous earths and the like from water.

It is the object of this invention therefore to provide a continuous compaction arrangement to seperate liquids from solids when these are in the form of slurries.

It is also to be realised that this invention is directed towards systems in which it is desirable to remove waste water from a wanted dewatered as much as it is for the removal of unwanted dewatered solids from a desirable liquid. An example of the former may be the removal of a desired precipitate from a chemical solution where a continuous process is desirable and an example of the latter may be the extraction of fruit juice from fruit juice pulp.

BRIEF SUMMARY OF THE INVENTION

In one form, therefore, the invention may be said to reside in a dewatering apparatus to dewater a slurry and produce a liquid product and a substantially dewatered product in a continuous process, the apparatus comprising an elongate screen chamber defined by at least one side wall, the at least one side wall comprising a screen arrangement, slurry inlet means at one end of the chamber and exit means at the other end of the chamber and a high pressure pump arrangement to supply slurry into the chamber through the inlet means.

It will be seen that by this invention there is provided a dewatering device which in continuous operation will pump slurry comprising solids and liquid at high pressure into a chamber and with the liquid being expelled through the side wall or walls of the chamber the dewatered solid product will be compacted in the end of the chamber and in a continuous process extruded from the chamber by the pressure of slurry in the chamber and be extruded through the exit means. There may be provided means to block the exit means during start up of the dewatering apparatus to allow a build up of compacted material before continuous extrusion begins.

It will be realised that if the mesh size in the chamber is selected to a particular size then the apparatus can be said to remove some material from the slurry but to allow other material to pass through the mesh. Hence the device could be used to remove material only above a certain size.

In one preferred embodiment the walls of the screen chamber may be cylindrical and comprised of a plurality of wedge bars arranged longitudinally and spaced apart to provide filtering spaces therebetween. With such wedge bars it will be noted they are arranged so that the gap between the bars becomes wider moving out from chamber or to the exterior of the screen to prevent the screen from clogging. The wedge bars will also provide a smooth internal surface along which the compacted wad of dewatered product may be extruded without catching on the bars.

Alternatively the chamber walls may be provided with a suitable mesh.

The screen chamber may be cylindrical or square or any other desired shape depending upon whether a dewatered product of a particular extruded shape is required.

The chamber may be enclosed by a housing to collect filtrate from the screen chamber and at least part may be under vacuum to assist with dewatering of the wad of dewatered material being produced in the chamber.

The pump to supply slurry at high pressure into the chamber may be any suitable form of positive displacement pump to provide such a high pressure such as a diaphragm pump or a piston pump. The pump arrangement may also include an auxiliary pump to supply extra pressure to the slurry in the chamber. Such an auxiliary pump may comprise a periodically acting piston pump and the slurry inlet means upstream from the auxiliary pump may include a one-way flow valve. By this means the main pump can supply fluid into the screen chamber and the auxiliary pump used at intervals to provide extra pressure to compact the wad as it is being formed and to extrude the wad without the extra pressure being directed back down the inlet pipe.

In one preferred form the walls of the screen chamber may include at least one movable wall such that the wall can be reciprocated into and out of the space within the chamber to provide extra compaction or compression of the dewatered product within the chamber as it is being formed and to assist with dewatering of the dewatered product. There may be provided suitable sealing or minimal clearance between the movable wall and the fixed walls of the screen chamber so that the device may still operate at high pressure.

In one preferred embodiment the pump arrangement may supply slurry at a pressure of up to 3,000 pounds per square inch and the auxiliary pump may be adapted to supply pressure up to 6,000 pounds per square inch. More than one pump acting in series or in parallel may be provided to give the required pressure or a single pump may be used to supply slurry to a number of dewatering devices in parallel with facilities provided to close off one or more devices at a time for cleaning and servicing.

The exit means may be an opening in the end of the screen chamber of the same size and continuous cross sectional area as the screen chamber so that in use dewatered product can continuously extrude through the opening. It will be realised that some form of gate means may be necessary when starting up the apparatus so that a wad of compacted material can build up before commencing extruding.

In one form of the invention the screen chamber may be cylindrical and 100 mm in diameter and 6 m long.

Alternatively the exit means may include a gate which can be opened at intervals to enable the extrusion of a plug of dewatered product.

Hence the exit means may merely be a gate means which may be closed until a sufficient wad of compacted material has been produced which then may be opened to allow the continuous extrusion of a wad of compacted material. There may be provided suitable knife means for instance or some other cut off arrangement associated with the gate means to cut the compacted material off at intervals as it is extruded.

In the case of removal of paper fibres from slurries from the paper making industry for instance the extruded material may be cut off in suitable lengths to be dried and used for burning in domestic fires or industrial incinerators or the material may be formed into shapes for further processing as a wood substitute.

In a further form the exit means may comprise a multi-chambered revolving extractor such that in one position a chamber of the extractor is in a plug of dewatered product receiving position and in a further position the chamber is in a plug of dewatered product removal position. There may be for instance an hydraulic ram provided to push out the compacted wad from the revolving extracted chamber in the removal position.

The rotary extractor may be provided with further dewatering means such as a vacuum dewatering system for each of the chambers so that the between the receiving position and the removal position further dewatering can be achieved by application of for instance a vacuum so that a very dry product may be produced.

In an alternative form the invention may then be said to reside in a method of dewatering a slurry on a continuous basis comprising pumping a slurry under high pressure into an elongated filter chamber, the filter chamber having an open end, causing a wad of dewatered material to build up in the chamber towards the open end and continuously extruding the wad from the open end by means of the slurry pressure exerted on the wad within the chamber.

With this form of the invention the extraction rate obtained will be dependant upon the rate of build up of the wad, that is upon the solids content of the slurry and also upon the pressure used to pump slurry into the chamber including any auxiliary pressure used.

DETAILED DESCRIPTION

This then generally describes the invention the subject of the present application but to assist with understanding of the invention reference will now be made to the accompanying drawings which show preferred embodiments of the invention.

Figure 1:
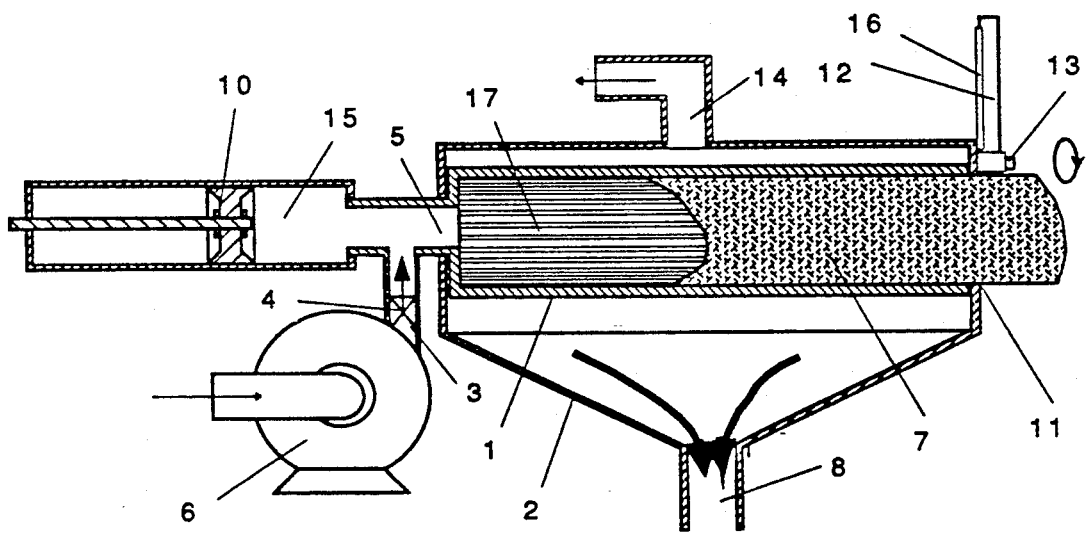
FIG. 1 shows a first embodiment of a dewatering apparatus according to this invention.

Now looking more closely at the drawings and in particular at FIG. 1, it will be seen that the dewatering apparatus of the present invention essentially comprises a screen chamber 1 defined by a wall comprised of wedge bars 17, in this case a cylindrical screen chamber surrounded by a housing 2. This housing may have vacuum applied through vacuum pipe 14 to it to assist with extraction of water from compacted material in the chamber. A slurry containing dewatered waste is fed by means of pump 6 through inlet pipe 3 past non-return valve 4 so that it enters the chamber through inlet means 5. The high pressure pump 6 is used to provide slurry at high pressure to the inlet pipe 3.

A wad 7 of compacted dewatered solids material 7 will build up in the chamber as liquid in the slurry is forced out through the walls of the screen chamber 1 into the housing 2 and out through the drain 8.

An auxiliary piston pump 9 includes a ram 10 acting in chamber 15 which at intervals may be activated by means not shown to provide extra pressure due to the incompressability of liquids to the compacted material within the chamber so that at intervals the compacted material 7 can be forced out from the screen chamber through the exit means 11. A rotating gate 12 rotating on axis 13 may be provided to close off the screen chamber during start up to allow build up of compacted material in the screen chamber. The gate may include sealing surface 16 to seal against the exit means. As discussed earlier the gate may include knife means to cut off the compacted material as it is extruded. The pressures used will of course depend upon the amount of particulate or fibrous material in the slurry and the rate of extrusion required. It is to be realised that for some slurries the auxiliary pump 9 will not be necessary.

Figure 2:
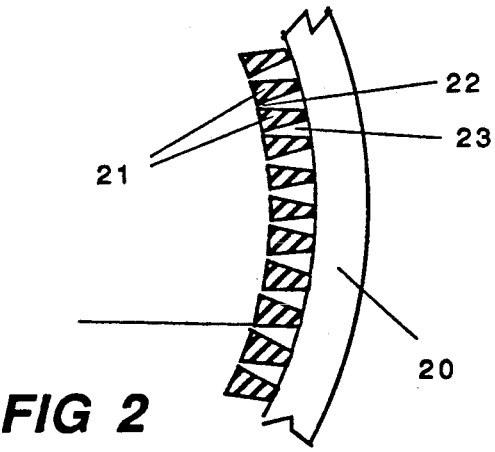
FIG. 2 shows a portion of a screen wall comprised of wedge bars.

FIG. 2 shows an embodiment of a screen chamber wall which includes wedge bars as the screen arrangement. The screen chamber wall includes a circumferential support bar 20 to which are fastened by welding or other suitable method a plurality of wedge bars 21 which define a space 22 between them at their widest point. These spaces 22 provide the filtering spaces and as will be particularly noted the space 23 behind the filtering spaces 22 enlarges beyond the width of the filtering space so that clogging of the filter bars will not occur. It will be noted also that the considerable depth of the wedge bars compared with their frontal surface area onto the screen chamber will provide considerable strength so such wedge bars may take a very high pressure within the screen chamber. Also by having the wedge bars extending longitudinally along the length of the screen chamber there may only be a small resistance to longitudinal movement of the compacted material in the screen chamber. Spacing and size of the wedge bars or wedge wires may of course be selected for the type and composition of the slurry to be dewatered or deliquified, however spacings may be in range of 0.25 millimeters down to 0.05 millimeters. As discussed as an alternative a perforated mesh screen may be used for the walls of the screen chamber.

Figure 3:
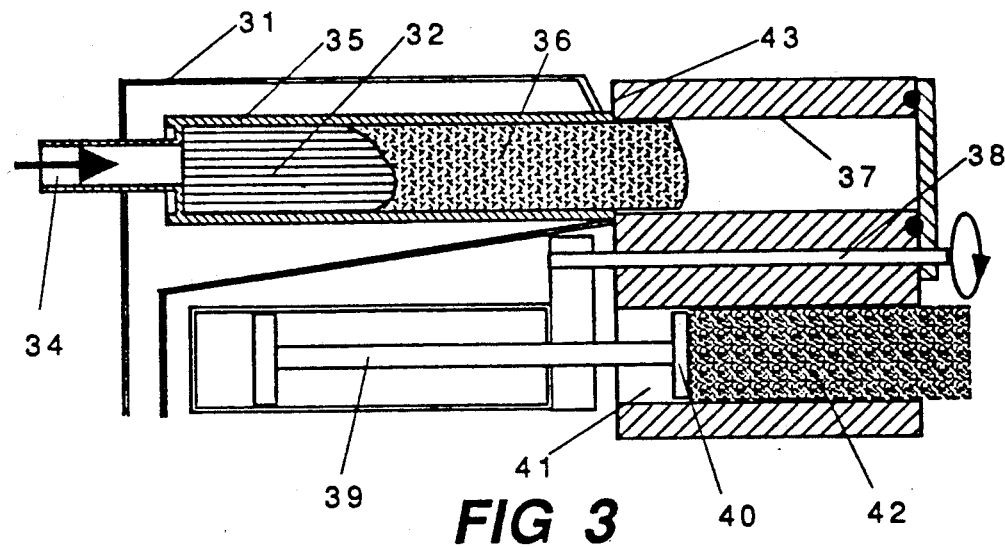
FIG. 3 shows an alternative form of compaction equipment with wad removal apparatus.

In the embodiment shown in FIG. 3, a similar form of screen chamber 30 is used with a housing 31 around the screen chamber but a rotary extractor 33 is used instead of the earlier arrangement. In this embodiment slurry is provided through inlet means 34 into the screen chamber 30 defined by a cylindrical wall 35 of wedge bars so that liquid will extrude out through the wall 35 of the screen chamber but the dewatered wad of product 36 will be extruded into the rotating extractor 33. The rotating extractor 33 includes a number of cylindrical chambers 37 rotating on an co-parallel axis 38. When a chamber is suitably full of a wad of compacted material the extractor 33 is rotated by means not shown with the edge 43 of the rotating extractor cutting off the wad of compacted material at the exit of the screen chamber so that a further cylindrical chamber presents itself to receive a further wad of compacted material and the compacted wad proceeds to a wad removal position. In this position a hydraulic ram 39 pushes an extractor plate 40 into the chamber 41 thereby pushing the wad 42 out, the extractor is then withdrawn ready for the rotating extractor to be rotated again for the next wad to be removed.

By this means the embodiment shown in FIG. 3 can be used as a continuous apparatus but with discreet wads of compacted material of a known size being produced.

Figure 4:
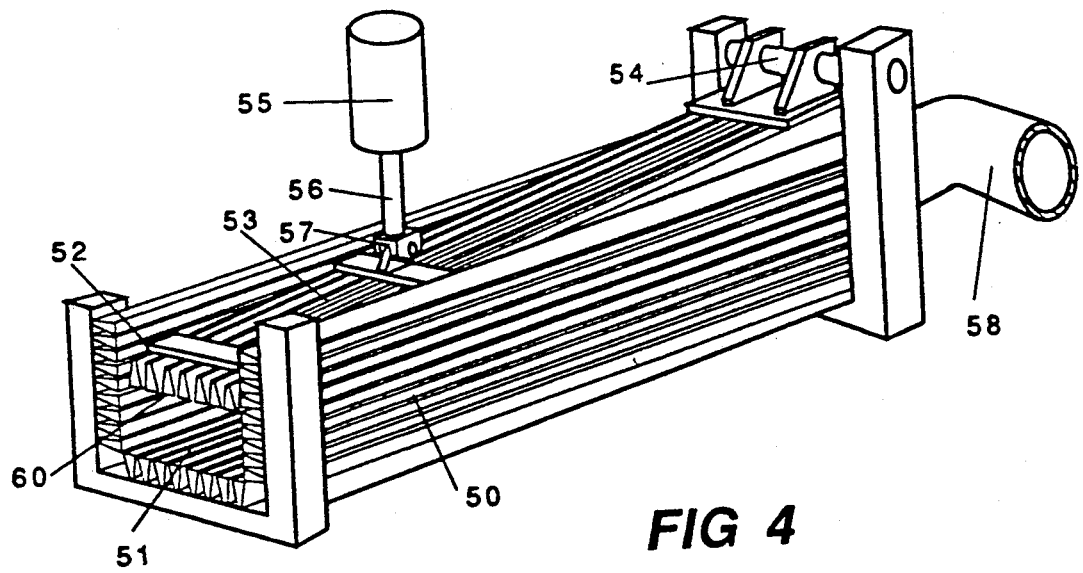
FIG. 4 shows an alternative embodiment of screen chamber.

FIG. 4 shows a further embodiment dewatering apparatus according to this invention. In this embodiment a square cross-sectional area screen chamber is provided. The screen chamber comprises three fixed walls 50, 51 and 52 and a movable wall 53. The movable wall 53 is pivoted on axis 54 so that it can be reciprocated by means of hydraulic ram 55 acting through arm 56 to connector 57 on the screen wall 53.

The outer housing of the screen chamber in this embodiment has been omitted for clarity. In use slurry is pumped through inlet pipe 58 to enter the screen chamber and liquid is allowed to escape through the walls 50, 51, 52 and 53. In the initial stage the reciprocating wall 53 is fully depressed so that it meets the wall 51 at one end thereby preventing the extrusion of any wad.

Once a reasonable quantity of wad has built up, the reciprocating wall 53 may be lifted slightly to allow extrusion for a short distance of a wad of compacted material by means of pressure at the inlet pipe 58 and then the reciprocating wall 53 may be reciprocated at regular intervals to allow extra compression of the wad as it is extruded so that the end 60 of the reciprocating wall 53 provides extra compaction of the product.

Suitable cut off means, not shown, may be provided to remove the wad at intervals.

In one preferred embodiment of this form of the invention the screen chamber may be two to six meters long with cross-sectional dimensions of 200 millimeters. The apertures between the wedge bars defining the wall in the screen chamber may range from 50 microns to 4 millimeters depending upon the type of product to be dewatered and the pressure in the chamber may range of 10 pounds per square inch to 6,000 pounds per square inch depending upon the product to be dewatered.

It will be seen that by this invention there is provided a continuously operating screen chamber with no moving parts in the screen thereby eliminating considerable wear problems.

I claim:

1. A dewatering apparatus to dewater a slurry and to continuously produce a liquid product and a substantially solid dewatered product, the apparatus comprising an elongate screen chamber having first and second ends and defined by at least one side wall, the at least one side wall comprising a screen arrangement, slurry inlet means at said first end of the chamber and said second end of the chamber defining an exit means for solid product, and a high pressure pump arrangement adapted to pump slurry to the chamber through the inlet means under high pressure so as to exert pressure directly onto the slurry to achieve the dewatering, wherein the exit means is an opening in the end of the screen chamber and said high pressure pump arrangement being operable for maintaining a continuously sufficient pressure for substantially maintaining the high pressure onto said slurry and said substantially solid dewatered product throughout said chamber and continuously extruding said solid product through the opening.

2. The dewatering apparatus of claim 1, wherein said at least one wall of the screen chamber defines a cylindrical chamber and said at least one wall is comprised of a plurality of wedge bars arranged longitudinally and spaced apart to provide the screen arrangement.

3. The dewatering apparatus of claim 1 wherein the pump arrangement includes an auxiliary pump to apply extra pressure to the slurry in the chamber.

4. The dewatering apparatus of claim 1 wherein said high pressure pump arrangement includes a first high pressure pump and an auxiliary pump which comprises a selectively actuated piston pump to provide extra pressure on the slurry in said chamber and the slurry inlet means includes a one-way flow valve.

5. The dewatering apparatus of claim 4 wherein said first high pressure pump supplies slurry to a pressure up to 3000 pounds per square inch (psi) and the auxiliary pump is adapted to supply pressures of up to 6000 psi.

6. The dewatering apparatus of claim 1 wherein at least one said side wall of screen chamber includes at least one movable wall such that said at least one movable wall can be reciprocated into and out of the interior of the chamber to provide extra compression of the dewatered product within the chamber to assist with dewatering of the dewatered product.

7. The dewatering apparatus of claim 1 wherein said opening comprises a multi-chamber revolving extractor such that in a first position a chamber of the extractor is in a product receiving position to receive a plug of said solid product and in a further position the chamber is in a product removal position for removal of said received plug of solid product.

8. The dewatering apparatus of claim 7 wherein said multi-chambered revolving extractor further includes a hydraulic ram which is adapted to act on said plug when said extractor in said product removal position to enable removal of said plug of said solid from said chamber of the extractor.

9. The dewatering apparatus of any of claims 1–6, 7 or 8 wherein a housing is provided around said screen chamber and said housing includes means to apply a vacuum to the interior of said housing to assist with dewatering of the slurry.

10. A method of dewatering a slurry on a continuous basis to produce a solid product and a filtrate comprising the steps of utilizing a pumping arrangement for pumping a slurry under high pressure into an elongate filter chamber having at least one side wall, the filter chamber having an open exit end, causing the dewatering of said slurry by substantially maintaining the high pressure thereon throughout said filter chamber by said pumping arrangement to produce a wad of solid product, causing said solid product to build up in the chamber towards the open exit end and continuously extruding the wad from the open end by means of the high pressure exerted on the slurry within the chamber, by the pumping arrangement.

11. The method of dewatering a slurry as in claim 10, wherein said filter chamber comprises parallel side walls which are fixed and said wad is formed within said chamber between said side walls.

* * * * *